(12) United States Patent
Hassan Firoozi et al.

(10) Patent No.: US 12,436,318 B2
(45) Date of Patent: Oct. 7, 2025

(54) METALENS ARRAY AND DISPLAY DEVICE HAVING SAME

(71) Applicant: Chiun Mai Communication Systems, Inc., New Taipei (TW)

(72) Inventors: Amir Hassan Firoozi, New Taipei (TW); Chen-Sheng Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 18/374,320

(22) Filed: Sep. 28, 2023

(65) Prior Publication Data

US 2024/0241380 A1 Jul. 18, 2024

Related U.S. Application Data

(60) Provisional application No. 63/533,510, filed on Aug. 18, 2023, provisional application No. 63/470,167, filed on May 31, 2023, provisional application No. 63/454,586, filed on Mar. 24, 2023, provisional application No. 63/439,685, filed on Jan. 18, 2023.

(51) Int. Cl.
| | | |
|---|---|---|
| G02F 1/29 | (2006.01) | |
| B82Y 20/00 | (2011.01) | |
| G02B 1/00 | (2006.01) | |
| G02B 1/10 | (2015.01) | |
| G02B 3/00 | (2006.01) | |
| G02B 27/01 | (2006.01) | |
| G02F 1/1343 | (2006.01) | |
| G09G 3/34 | (2006.01) | |

(52) U.S. Cl.
CPC ............ *G02B 3/0056* (2013.01); *B82Y 20/00* (2013.01); *G02B 1/002* (2013.01); *G02B 1/10* (2013.01); *G02B 3/0043* (2013.01); *G02B 3/0068* (2013.01); *G02B 27/0172* (2013.01); *G02F 1/134318* (2021.01); *G02F 1/13439* (2013.01); *G02F 1/291* (2021.01); *G09G 3/344* (2013.01); *G02B 2027/0178* (2013.01); *G02B 2207/101* (2013.01); *G02F 2202/36* (2013.01)

(58) Field of Classification Search
CPC ........ G02B 27/0172; G02B 2027/0178; G02F 1/291; G02F 1/29; G02F 1/134309; G02F 1/13439; G02F 2202/36; G02F 1/134318
See application file for complete search history.

(56) References Cited

U.S. PATENT DOCUMENTS

| | | | | |
|---|---|---|---|---|
| 2019/0094625 | A1* | 3/2019 | Haseba | G02F 1/1393 |
| 2021/0288095 | A1* | 9/2021 | Delga | H01L 27/1465 |
| 2024/0151973 | A1* | 5/2024 | Fu | G02B 27/106 |

FOREIGN PATENT DOCUMENTS

| | | |
|---|---|---|
| CN | 113050295 A | 6/2021 |
| CN | 216351591 U | 4/2022 |
| CN | 115453670 A | 12/2022 |
| WO | 2022177725 A1 | 8/2022 |

\* cited by examiner

*Primary Examiner* — Paisley L Wilson
(74) *Attorney, Agent, or Firm* — ScienBiziP, P.C.

(57) ABSTRACT

A metalens array and a display device are provided, the metalens array includes at least one optical transparent substrate; and a plurality of nanostructures arranged on the at least one optical transparent substrate, the plurality of nanostructures arranged in a predetermined shape to define a plurality of metalenses, and the plurality of metalenses arranged in an overlapping configuration.

15 Claims, 15 Drawing Sheets

41

$$Aov = R^2 * arccos\left(\frac{d}{2R}\right) - \frac{1}{4}d * \sqrt{4R^2 - d^2}$$

$$Ac = \pi R^2$$

$$AA_{single\_lens} = Ac - 4 * Aov$$

Single metalen     Doublet metalens    Two metalenses

METALENS ARRAY AND DISPLAY DEVICE HAVING SAME

CROSS-REFERENCE TO RELATED APPLICATIONS

This application claims priority to U.S. provisional Application No. 63/454,586 filed on Mar. 24, 2023, U.S. provisional Application No. 63/439,685 filed on Jan. 18, 2023, U.S. provisional Application No. 63/470,167 filed on May 31, 2023, and U.S. provisional Application No. 63/533,510 filed on Aug. 18, 2023 in the United States Patent and Trademark Office (USPTO), the contents of which are incorporated by reference herein.

FIELD

The subject matter herein generally relates to optics technology, and particularly to a metalens array and a display device.

BACKGROUND

Augmented Reality (AR) is a display technology that integrates virtual information with the real world. That is, based on the real world observed by the human eye, the virtual image information projected by an electronic device is integrated. Traditionally head-mounted AR display devices usually include a camera for capturing images within the viewer's field of view, and project virtual image information to a preset position within the viewer's field of view according to the captured image.

The lens-array configuration provides a promising solution to reduce the gap between the micro display and the optical system as shown in FIGS. 1A and 1B. However, the conventional glass (or polymer) micro-lens arrays are bulky, heavy and suffer from large chromatic and spherical aberration, low image quality, and have no disadvantages that can be adjusted freely.

Metalenses enable a facile approach to manipulate the light properties. In addition, metalenses can be designed with great degree of freedom, they are super thin and light weight and are mostly compatible with CMOS fabrication technology.

It needs mentioning that, replacing a typical metalens with the one with higher numerical aperture (NA) seems not very practical. Therefore, the focal length of a metalens is usually greater than half of the metalens diameter (NA<0.7). Thus, to significantly shrink the gap between the micro display and metalens, designing metalenses in an array form is necessary. However, there is an issue even if we use a metalens-array and that is the pixelation, which is the result of the space between adjacent lenslets and the imperfection of the metalens edge that do not contribute to focusing and the necessity of using digital image processing to eliminate the pixelation hinders the real-time application of the metalens-array.

Based on the above-mentioned shortcomings, the applicant found that the use of an overlapping metalens array can enable a uniform illumination of the projected light from the micro display to user's eyes hence, to overcome the above drawbacks. Therefore, there is a need for head-mounted display system for instance to solve the pixelation problem and realize thinner and lighter system to improve the user experience.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape or other word that the term modifies, such that the component need not be exact. The term "comprising," when in utilized, means "including, but not necessarily limited to", it specifically indicates open-ended inclusion or membership in the so-described combination, group, series, and the like.

Augmented Reality (AR) is a display technology that integrates virtual information with the real world. That is, based on the real world observed by the human eye, the virtual image information projected by an electronic device is integrated. Traditionally head-mounted AR display devices usually include an image capturing module and a display device for capturing images within the viewer's field of view, and project virtual image information to a preset position within the viewer's field of view according to the captured image.

Figure 1A:
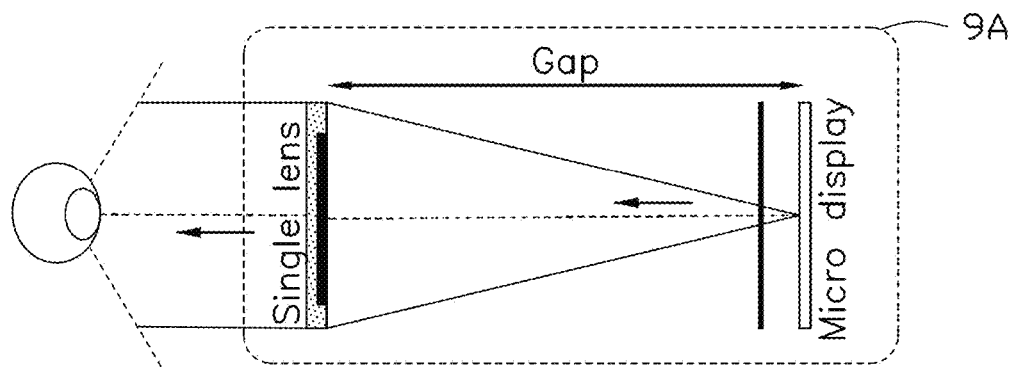
FIGS. 1A and 1B illustrates two schematic diagrams of two exemplary head-mounted display devices.
Figure 1B:
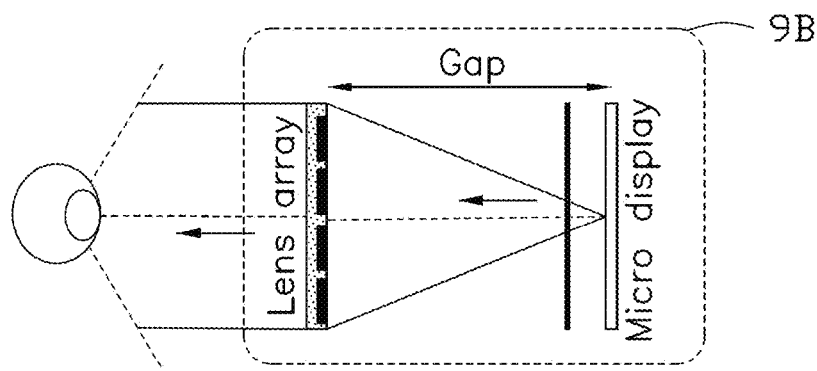

FIGS. 1A and 1B illustrate two exemplary head-mounted display devices 9A (single lens) and 9B (lens-array), which are commonly seen in the market for the application of delivering or displaying augmented reality (AR), virtual reality (VR), or mixed reality (MR).

As shown in FIG. 1A, in order to shorten a distance between a micro display and single lens installed in a display device 9A, FIG. 1B shows a lens array approach applied to the display device 9B. Although, a sharp phase gradient is required to highly diffract the light at the edge of a lens which usually cannot be fulfilled due to fabrication imperfection. Moreover, the edge effect causes sever distortion especially for rectangular lenses and for circular lenses inactive areas between lenses is an addition to the above-mentioned matter. Here, an overlapping metalens array is proposed to address the issues above. Furthermore, the pixelation as a result of the lens-array can be significantly mitigated.

Figure 2A:
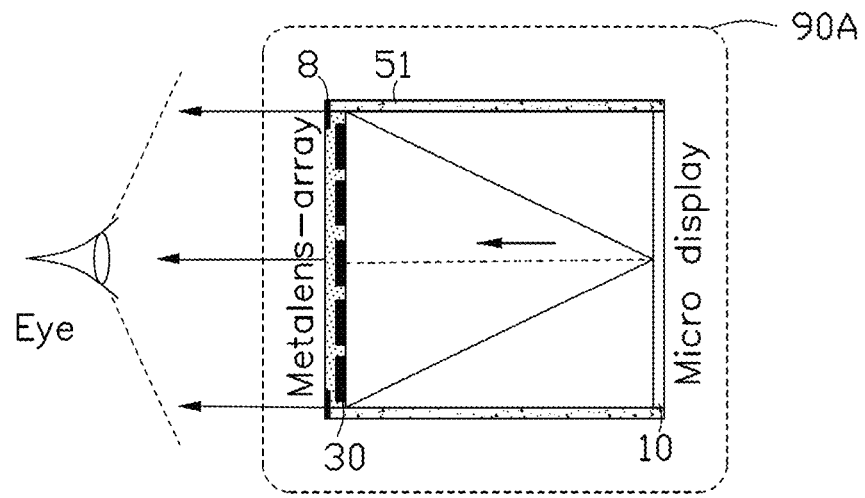
FIG. 2A illustrates a schematic diagram of one embodiment of this application of a configuration of a metalens array applying to a display device (without a polarizer).

FIG. 2A illustrates one embodiment of this application of a configuration of a metalens array 30 applying to a display device 90A (without a polarizer 20). As shown in FIG. 2A, one light emits from a micro display 10 and the micro display 10 displays a real image shown to the observer's eyes. However, depending on the design and the distance between the micro display 10 and metalens array 30, a real or virtual, polarized based 3D, Anaglyphic, holographic, floating image depends on the design can be formed. The micro display 10 and the metalens array 30 are uniformly separated using a spacer 51. The light beam may be restricted by a shading part 8 to block the light passing through a peripheral area of the metalens array 30. In this embodiment, the display device 90A does not include a polarizer 20 and an optically transparent glue 53 as shown in FIG. 2B.

Figure 2B:
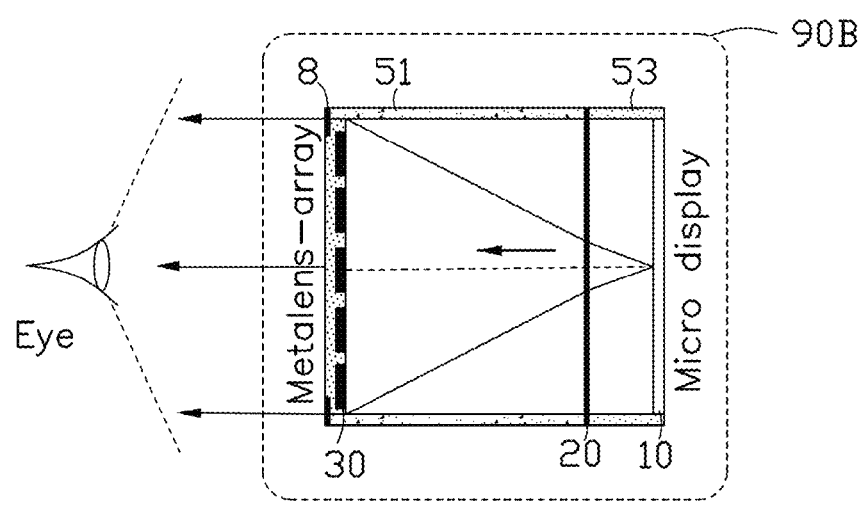
FIG. 2B illustrates a schematic diagram of another embodiment of this application when a configuration of the metalens array applying to a display device (with a polarizer).

FIG. 2B illustrates another embodiment of this application when a configuration of the metalens array 30 applying to a display device 90B (with a polarizer 20). In this embodiment, the displaying device 90B can be an augmented reality (AR), virtual reality (VR), or mixed reality (MR) device. As shown in FIG. 2B, the configuration of the display device 90B includes a micro display 10, a polarizer 20 (linear polarizer or circular polarizer), and a metalens array 30. An optically transparent glue 53 is positioned between the polarizer 20 and micro display 10, and the spacer 51 is positioned between the polarizer 20 and metalens array 30, respectively. A shading part 8 to block the light passing through the peripheral area of the metalens array 30 is positioned in front of the metalens array 30.

Figure 9A:
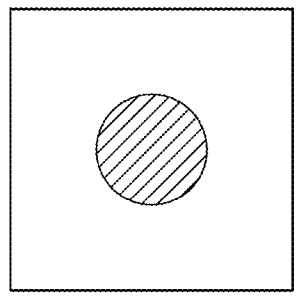
FIGS. 9A-9E illustrate top views of the one nanostructure which can be an isotropic or anisotropic nanostructure.
Figure 9B:
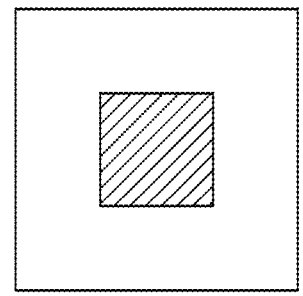
Figure 9C:
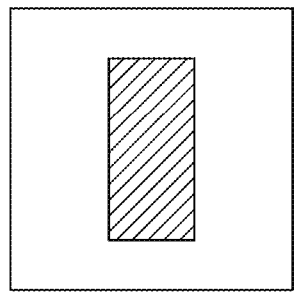
Figure 9D:
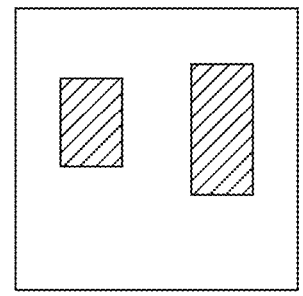
Figure 9E:
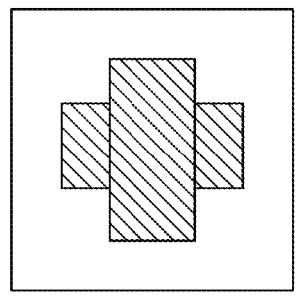

As shown in FIG. 2B, the polarizer 20 is a circular polarizer to circularly polarize the light illuminated from the micro display 10. In another embodiment, the polarizer 20 is a liner polarizer or a combination of a liner polarizer and a quarter-wave plate to form a circular polarizer. The polarizer 20 is laminated to the micro display 10 using the optically transparent glue 53. The light beam can be restricted by the shading part 8 to block the light passing through the peripheral area of the metalens array 30. This polarizer-dependent scheme is used when anisotropic nanostructures (41) are utilized as shown in FIG. 9C, FIG. 9D, and FIG. 9E and work based on geometrical-phase principle or other principles that enable $2\pi$ phase change to fully manipulate the light emitted from the micro display 10.

In some embodiments, the materials of nanostructures are composed of dielectric ($TiO_2$, GaN, Si, $Nb_2O_5$, $SiO_2$, Photoresist, Metal oxide nanoparticles and sol-gel mixture, etc.), metal (like gold, silver, aluminum, etc.) or/and other active materials (2D materials, $VO_2$, GST, metallic polymers).

Figure 3:
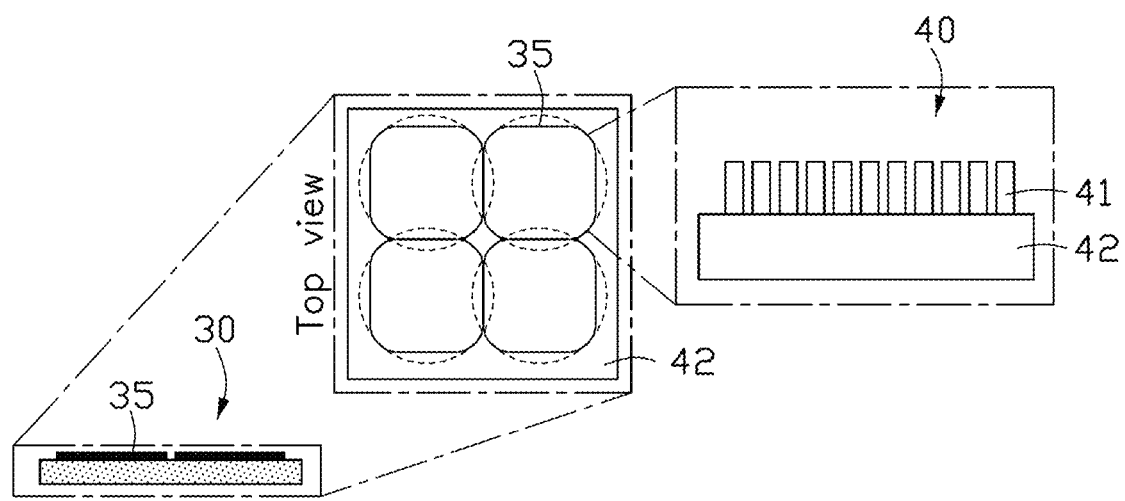
FIG. 3 illustrates one embodiment of side view and top view (for four metalenses) of the metalens array disclosed in FIGS. 2A and 2B showing a single overlapped lenslet.

FIG. 3 illustrates one embodiment of side view and top view (for four metalenses) of the metalens array 30 disclosed in FIGS. 2A and 2B showing a single overlapped lenslet. The metalens array 30 is an overlapping metalens array from the top view. The overlapping metalens array has a close-packed shape with the least inactive area to make the best use of the micro display resolution, and each column of the metalens array 30 can be evenly distributed or have an offset in each column or row respect to previous column or row. Each metalens also can have different diameters. The overlapping factor d varies depends on the micro display pixel size and arrangement in order to smoothen the pixelation caused by the grid of metalens array as shown in FIG. 13.

As shown in FIG. 3, each metalens 35 of the metalens array 30 is overlapped to adjacent metalenses. Each metalens 35 of the metalens array 30 includes a plurality of nanostructures 41 and a substrate 42. The substrate 42 can be any type of optical transparent substrate, such as glass made of fused silica ($SiO_2$) or Sapphire in a transmissive scheme or in a reflective scheme can be made of silicon and other materials. The plurality of nanostructures 41 are designed and fabricated on the surface of the substrate 42 so as to form a metasurface. The plurality of nanostructures 41 define a plurality of metalenses 40 which can be arranged in any desired arrangement, such as a grid or rows and columns of the plurality of metalenses 40. The plurality of metalenses 40 are arranged in an overlapping configuration. The plurality of nanostructures 41 can be a passive structure and made from materials such as dielectric like $TiO_2$, GaN, Si, $Nb_2O_5$, $SiO_2$, Photoresist, Metal oxide nanoparticles and sol-gel mixture, etc., or metal like gold (Au), silver (Ag), aluminum (Al), etc. of different thicknesses ranging from 150 nm to a few thousand nanometers for dielectric meta-atoms and 20 nm to 400 nm for the metallic case however, not limited only to these ranges. In some embodiments, a metalens array 30 comprises at least one substrate 42 (such as optical transparent substrate) and a plurality of nanostructures 41 arranged on the at least one substrate 42. The plurality of nanostructures 41 are arranged in a predetermined shape to define a plurality of metalenses 40, and the plurality of metalenses 40 are arranged in an overlapping configuration (see at least FIG. 3). In another embodiment, the plurality of nanostructures 41 is changeable for active and focus-adjustable metalens utilizing phase changing materials.

Moreover, the plurality of nanostructures 41 can turn into an active and focus-adjustable metalens utilizing any phase changing materials like GST ($Ge_2Sb_2Te_5$), vanadium dioxide ($VO_2$), and gallium (Ga) and other active materials such as transparent conducting oxides (like ITO and AZO), thin 2D materials (graphene, hBN, and $WS_2$), liquid crystal, metallic polymer, and so on as shown in FIG. 5, FIG. 6, FIG. 7, and FIG. 8. Therefore, a programmable metalens is achievable to thoroughly or locally change the light modulation.

Figure 4A:
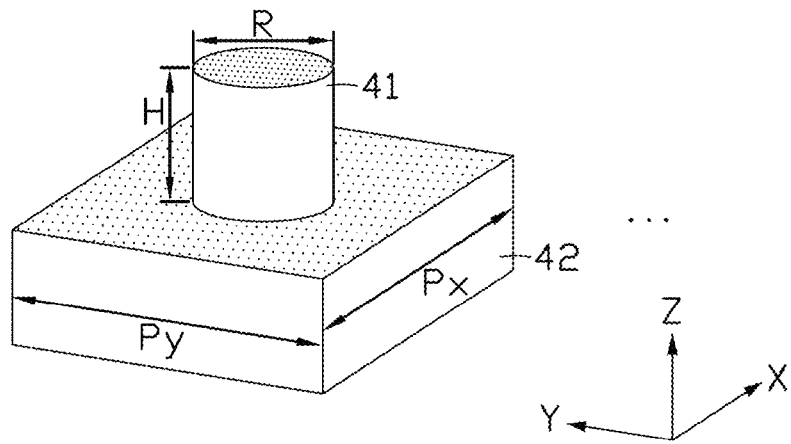
FIGS. 4A and 4B illustrate embodiments of a unit cell of a passive metalens of the metalens array of FIG. 3.

FIG. 4A illustrates one embodiment of a unit cell of a passive metalens of the metalens array 30 of FIG. 3. It should be known that, FIGS. 4A, 4B, 5, 6, 7, and 8 may illustrate at least one cell of a passive metalens of the metalens array 30 of FIG. 3, there should be a plurality of unit cells forming the metalens, and there are a plurality of metalens forming the metalens array; or the metalens array is formed by arranging a plurality of metalens, and each metalens is formed by arranging a plurality of unit cells. The unit cell includes one nanostructure 41 with a dimension of radius R, height H and one substrate 42 with a dimension of pitch Px (along x-direction), and pitch Py (along y-direction). In some embodiments, the unit cells of the metalens array 30 may be in a same size or in different sizes. For example, three or more different unit cells may be used, because different pitch, width, length is required for each color but the same height for all colors. However, in some special embodiments, the same unit cell (the same pitch) for all colors (with different widths and lengths, but the same height) can be used. In another embodiment, the metalens array 30 includes at least one optical transparent substrate 42 and a plurality of nanostructures 41 arranged on the at least one optical transparent substrate 42.

Figure 4B:
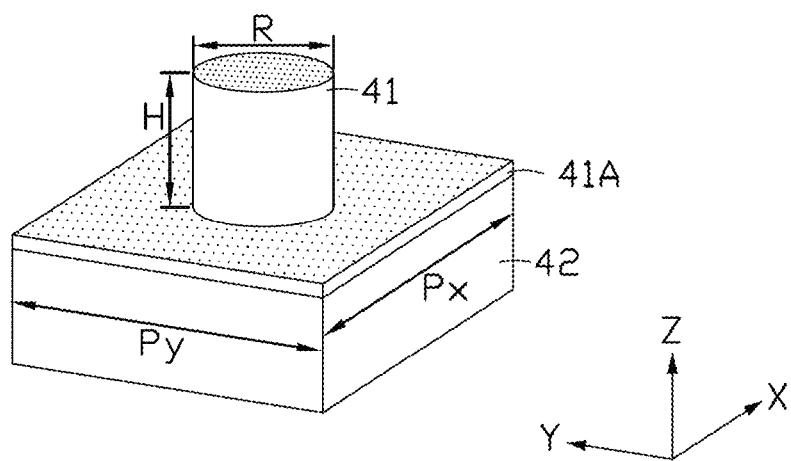

FIG. 4B illustrates one embodiment of a unit cell of a passive metalens of the metalens array 30 of FIG. 3. The unit cell includes one nanostructure 41 with a dimension of radius R, height H and one substrate 42 with a dimension of pitch Px (along x-direction), and pitch Py (along y-direction). Directly nanoimprinted nanostructure using metal oxide nanoparticles and sol-gel mixture such as $TiO_2$ and ITO with sol-gel on a transparent substrate without depositing/growing any high refractive index dielectric materials or metallic materials. A residual resin mixture 41A shown after direct nanoimprint. In another embodiment, the metalens array 30 further includes a residual resin mixture 41A deposed on the at least one optical transparent substrate 42.

Figure 5:
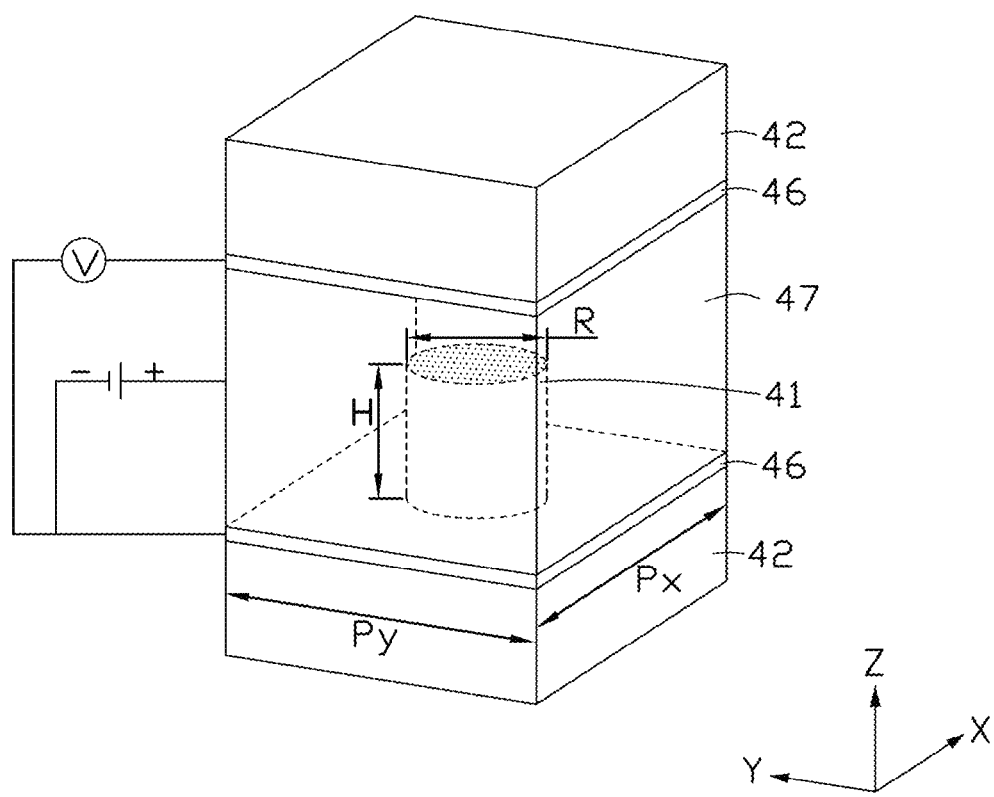
FIG. 5 illustrates another embodiment of a unit cell of a metallic polymer-based active metalens of the metalens array of FIG. 3.

FIG. 5 illustrates another embodiment of a unit cell of a metallic polymer-based active metalens of the metalens array 30 of FIG. 3. As shown in FIG. 5, the nanostructures 41 are made from metallic polymer. The metallic polymer can be such as PEDOT:PSS (poly(3,4-ethylenedioxythiophene):poly (-styrene sulfonate) or any conducting polymers. The nanostructure 41 is sandwiched between two glasses 42 which have a transparent electrode 46 deposited on each of the two glasses 42, the transparent electrode 46 can be such as indium tin oxide (ITO). Then the unit cell is filled by a filled material 47. That is, the nanostructure 41 and the filled material 47 are sandwiched between the two substrates 42 through a pair of transparent electrodes 46. In some embodiments, the filled material 47 is electrolyte or a gel electrolyte. Thus, the unit cell of the metalens array 30 is adjustable between a metallic state and insulating state using an applied voltage. In another embodiment, the metalens array 30 further includes a pair of transparent electrodes 46, the at least one optical transparent substrate 42 are two optical transparent substrates 42, the plurality of nanostructures 41 are covered by a filled material 47, the plurality of nanostructures 41 and the filled material 47 are sandwiched between the two optical transparent substrates 42 through the pair of optical transparent electrodes 46, the filled material 47 is selective from electrolyte or gel electrolyte, such that the pair of optical transparent electrodes 46 is configured to be applied with a voltage to adjust the metalens array between a metallic state and an insulating state.

Figure 6:
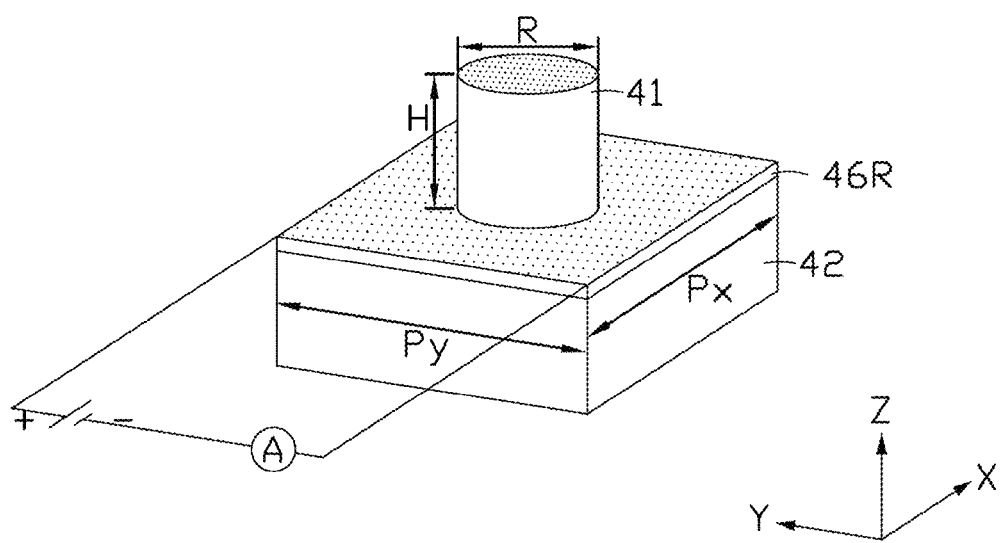
FIG. 6 illustrates another embodiment of a unit cell of a phase changing material-based active metalens of the metalens array of FIG. 3.

FIG. 6 illustrates another embodiment of a unit cell of a phase changing material-based active metalens of the metalens array 30 of FIG. 3. The nanostructure 41 is a phase changing material such as GST ($Ge_2Sb_2Te_5$), vanadium dioxide ($VO_2$), and gallium (Ga) but not limited to these three materials which mostly work based on a resistive heating film 46R. The substrate 42 is made of glass, sapphire, silicon, polysilicon and so on. The resistive heating film 46R is configured to be applied with electric current. In another embodiment, the plurality of nanostructures 41 are made of at least one phase changing material, the plurality of nanostructures 41 are arranged on a surface of the at least one optical transparent substrate 42 through a resistive heating film 46R, the resistive heating film 46R is configured to be applied with electric current.

Figure 7:
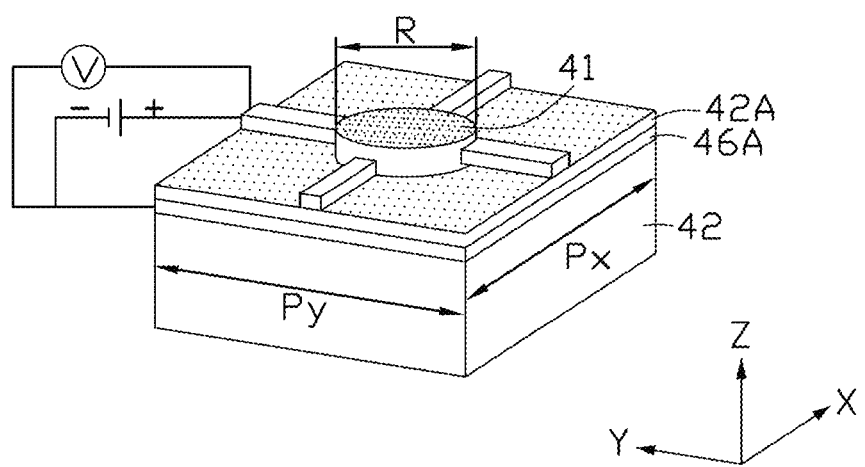
FIG. 7 illustrates another embodiment of a unit cell of a 2D material-based active metalens of the metalens array of FIG. 3.

FIG. 7 illustrates another embodiment of a unit cell of a 2D material-based active metalens of the metalens array 30 of FIG. 3. The nanostructures 41 is composed of patterned 2D materials such as graphene, hBN, and $WS_2$ which separated by a thin dielectric film 42A like $Al_2O_3$, $SiO_2$, TOPAS. The conducting layer 46A is a transparent or non-transparent conducting layer, the conducting layer 46A can be made of gold, silver, aluminum, ITO, AZO or polysilicon and so on. The substrate 42 can be made of dielectric material like $SiO_2$ or sapphire or can be made of metal or semiconductor materials. The conducting layer 46A and the nanostructures 41 are configured to be applied with voltage to adjust the metalens array between the metallic state and the insulating state. In another embodiment, the plurality of nanostructures 41 are composed of patterned 2D materials, the plurality of nanostructures 41 are arranged on a surface of the at least one optical transparent substrate 42 through a thin dielectric film 42A and a conducting layer 46A, the conducting layer 46A and the plurality of nanostructures 41 are configured to be applied with voltage to adjust the metalens array between a metallic state and an insulating state.

Figure 8A:
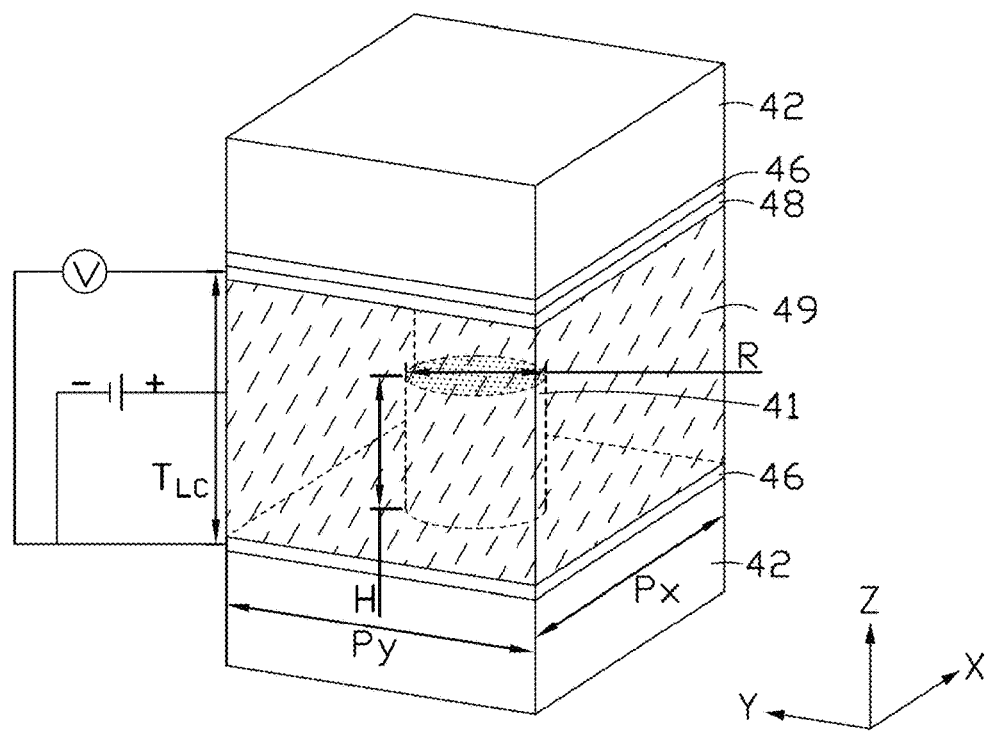
FIG. 8A and FIG. 8B illustrate some embodiments of a unit cell of a liquid crystal-based active metalens of the metalens array of FIG. 3.
Figure 8B:
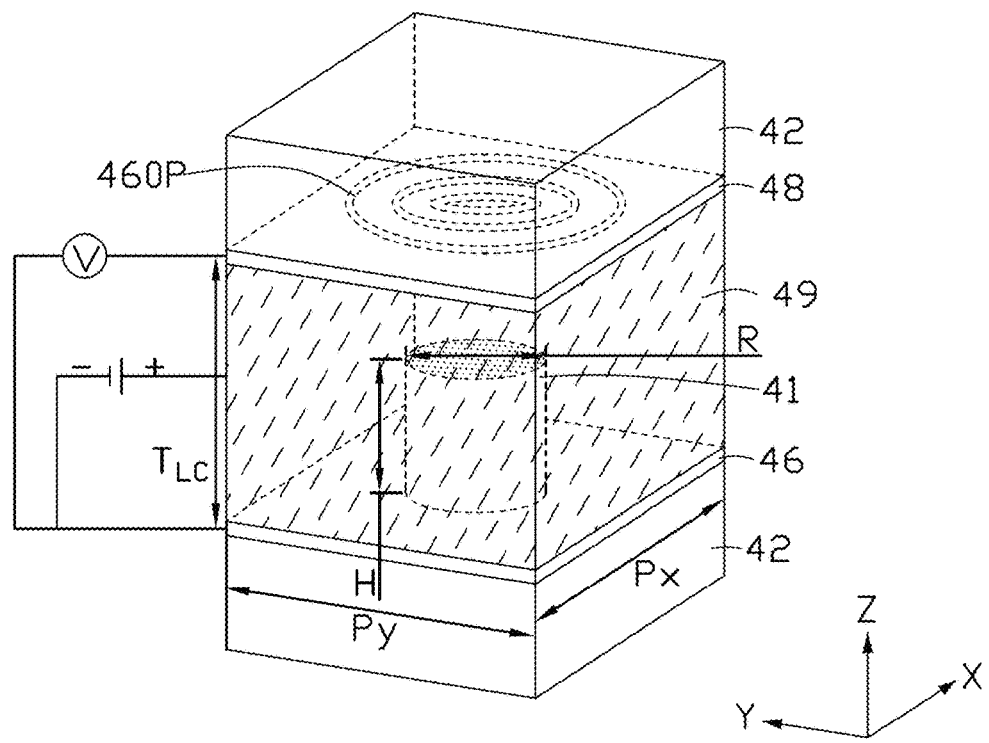

FIG. 8A and FIG. 8B illustrate some embodiments of a unit cell of a liquid crystal-based active metalens of the metalens array 30 of FIG. 3. As shown in FIG. 8A, the nanostructure 41 is sandwiched by two glasses 42 with two deposited ITO (Indium Tin Oxide) layers 46 thereon. An alignment layer 48 is either mechanically rubbed or is photoalignment layer usually made of polyimide or other organic compound such as Azo dye molecules. The nanostructure 41 can be dielectric or metal (or any earlier mentioned materials). The unit cell is filled with liquid crystal 49 and two glasses 42 with deposited ITO layer 46. As shown in FIG. 8A, the two glasses 42 and ITO layers 46 are separated using a spacer 48 to keep the thickness TLC uniform throughout the unit cell. The nanostructure 41 is covered by a liquid crystal 49. The two ITO layers 46 are configured to be applied with voltage, which may change ambient refractive index of the liquid crystal 49. In another embodiment, the metalens array 30 further includes two ITO layers 46 and two alignment layers 48, the at least one optical transparent substrate 42 are two optical transparent substrate 42, the plurality of nanostructures 41 are covered by liquid crystal 49, the nanostructures 41 and the liquid crystal 49 are sandwiched between the two optical transparent substrates 42 through the two alignment layers 48 and the two ITO layers 46, the two ITO layers 46 are configured to be applied with voltage.

The liquid crystal cell can work in two ways, one approach is as shown in FIG. 8A, the liquid crystal is injected between two plain transparent electrodes (ITO layers) 46 which act as the ambient refractive index changing since the resonance of the nanostructures are very sensitive to the ambient refractive index, therefore if carefully designed it can tune the output light at will. The second approach is as shown in FIG. 8B, that liquid crystal can contribute to the light steering if the top electrode 460P is patterned through photolithography process, thus, it acts as a compensating and correcting liquid crystal lens or liquid crystal grating to remove the aberration that cannot be eliminated by the overlapping metalens array. The patterned electrodes 460P in FIG. 8B can be circular, rectangular or any shapes even grating and in array form and each electrode can be individually controlled. In another embodiment, the metalens array further includes a top electrode 460P, the top electrode 460P is patterned on one of the two ITO layers 46, the two ITO layers 46 are configured to be applied with voltage.

The plurality of the nanostructures 41 could be formed in different isotropic, anisotropic, or combination of isotropic and anisotropic shapes depending on the desired spectrum of light and degree of phase and amplitude modulations. Each of the plurality of the nanostructures 41 can be substantially circular shown in FIG. 9A, triangular, square shown in FIG. 9B, rectangular shown in FIG. 9C, or have an anisotropic shape shown in FIG. 9D and FIG. 9E. For example, the isotropic shapes can be circular shape, square shape with the same size no matter from which side to look at them. For example, the anisotropic shapes can be rectangular shape, "L" shape, "H" shape or any shape with different sizes from different sides to look at them. One of the pluralities of the nanostructures 41 is circular in shape shown in FIG. 5, according to one embodiment. Each of the plurality of the nanostructures 41 is separated from each other by a pitch size in X direction of Px, which is from 150 nm to 700 nm, and a pitch size in Y direction of Py, which is from 150 nm to 700 nm. The pitch defines in two ways, either center-to-center of two adjacent nanostructures or edge-to-edge of two adjacent nanostructures. Each of the plurality of the unit cell nanostructures 41 can have a diameter of D, which is from 40 nm to 400 nm. Each of the plurality of the unit-cell nanostructures 41 can have a height of H, which is from 20 nm to 3000 nm. However, these values can be different for anisotropic nanostructures. In another embodiment, the plurality of nanostructures 41 can be formed in an isotropic, an anisotropic, or a combination of isotropic and anisotropic shapes.

Figure 10:
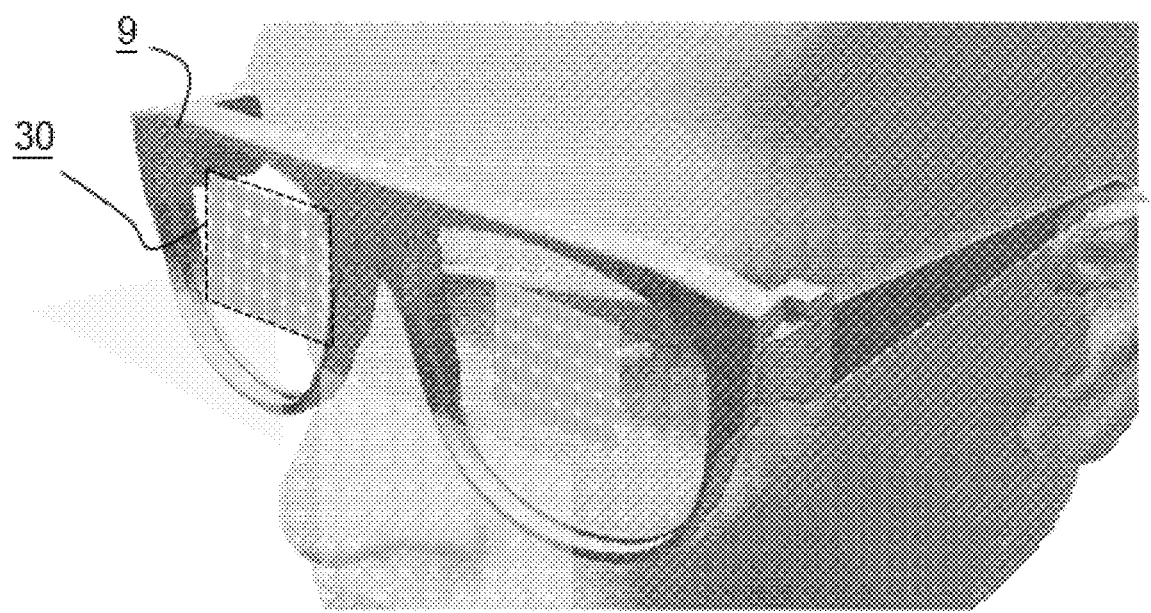
FIG. 10 illustrates a schematic view of the proposed AR/VR device.

FIG. 10 illustrates a schematic of the one of the applications of the metalens array 30 applying to AR/VR/MR devices 9.

Figure 11:
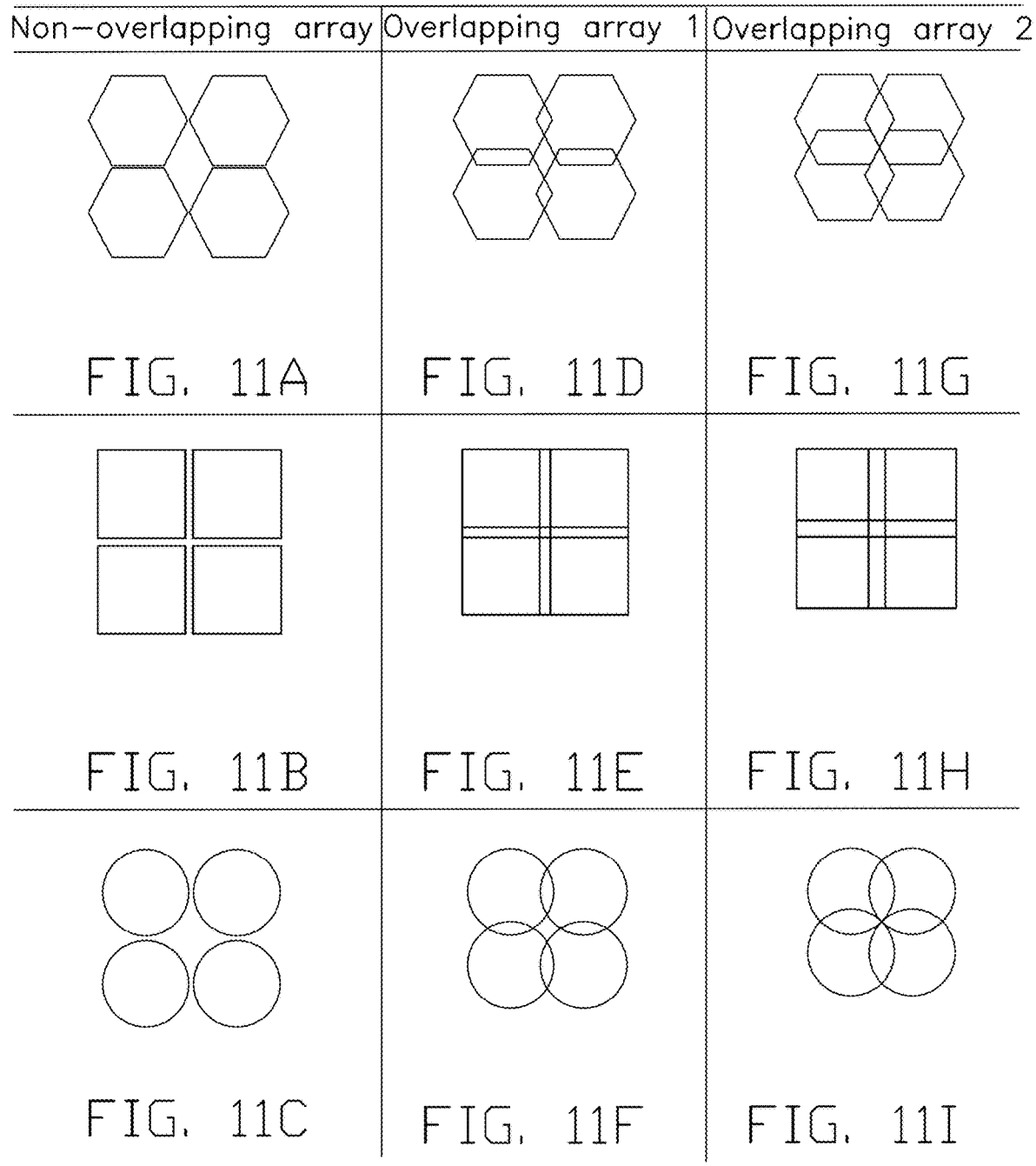
FIGS. 11A-11I illustrate embodiments of a non-overlapping metalens arrays and overlapping metalens arrays.

FIG. 11 illustrates some embodiments of non-overlapping metalens arrays and overlapping metalens arrays. FIGS. 11A, 11B, and 11C show a non-overlapping metalens arrays applied to the metalens array 30 of FIG. 3. According to some embodiments, the plurality of the metalens arrays 40 arranged in different configurations. The plurality of the metalens arrays 40 could be arranged as array of metalenses with different shapes such as square, triangle, pentagon, hexagonal, circle, etc. As shown in FIGS. 11D, 11E, 11F, 11G, 11H and 11I, each metalens overlaps with its neighbors and each metalens contains the nanostructures as explained above. The overlapping array can be fabricated using different methods such as Electron-beam lithography (EBL), Deep Ultraviolet (DUV) Photolithography, Extreme ultraviolet lithography (EUV), Nanoimprint lithography, and Direct Nanoimprint using mixture of metal oxide nanoparticles and sol-gel. The size of the overlapping metalens array varies from millimeter to centimeters depending on the micro display dimensions and its pixel size.

Figure 12:
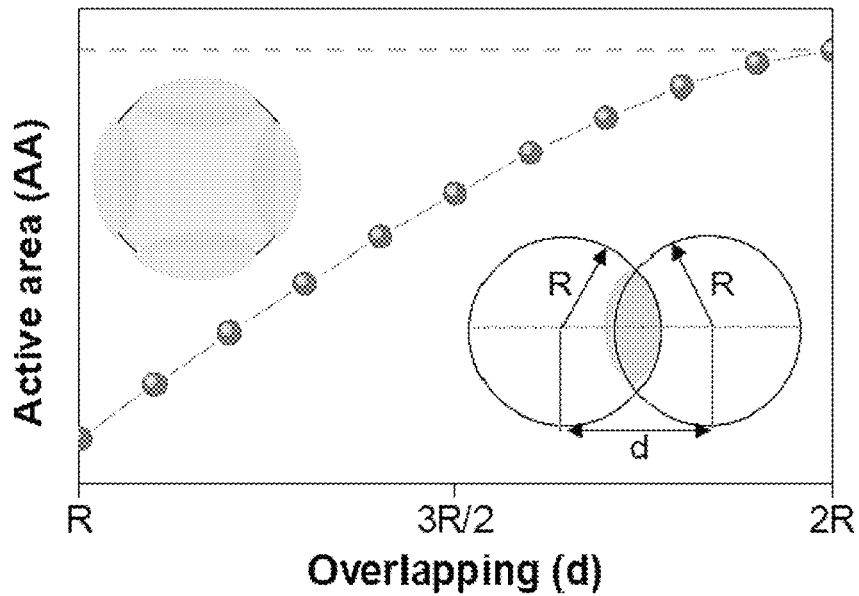
FIG. 12 illustrates the active area of each metalens after overlapping with adjacent metalenses as a function of the overlapping factor (d).

FIG. 12 shows the calculated active area of a truncated circular metalens in an overlapping array which is given by $AA_{single\_lens}$. The overlapping factor is d. $A_c$ is the area of an intact circle with radius R. $A_{ov}$ represents the cut away areas from a single circular metalens. The "arccos" remarks the arc cosine. When d=2R the circles do not overlap. $A_s$ overlapping increases the pixelation eliminates therefore, finding an appropriate value for dis of great significance.

$$Aov = R^2 * \arccos\left(\frac{d}{2R}\right) - \frac{1}{4}d * \sqrt{4R^2 - d^2} \tag{1}$$

$$Ac = \pi R^2 \tag{2}$$

$$AA_{single\_lens} = Ac - 4 * Aov \tag{3}$$

FIGS. 13A to 13D show the how effectively pixelation is eliminated when an overlapping metalens array when circles are 30% overlapped (d=0.7*2R).

Figure 13A:
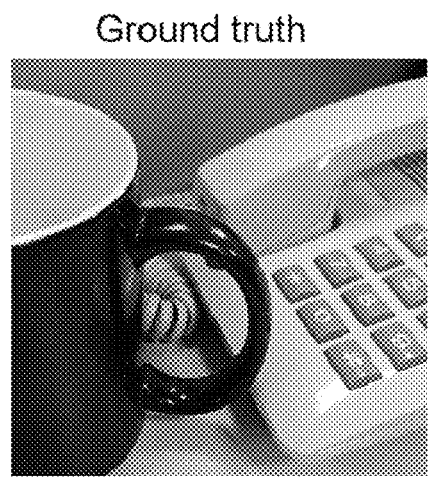
FIGS. 13A-13D illustrate the result of the 30% overlapped circular metalens array on pixelation-effect elimination.
Figures 13B, 13C:
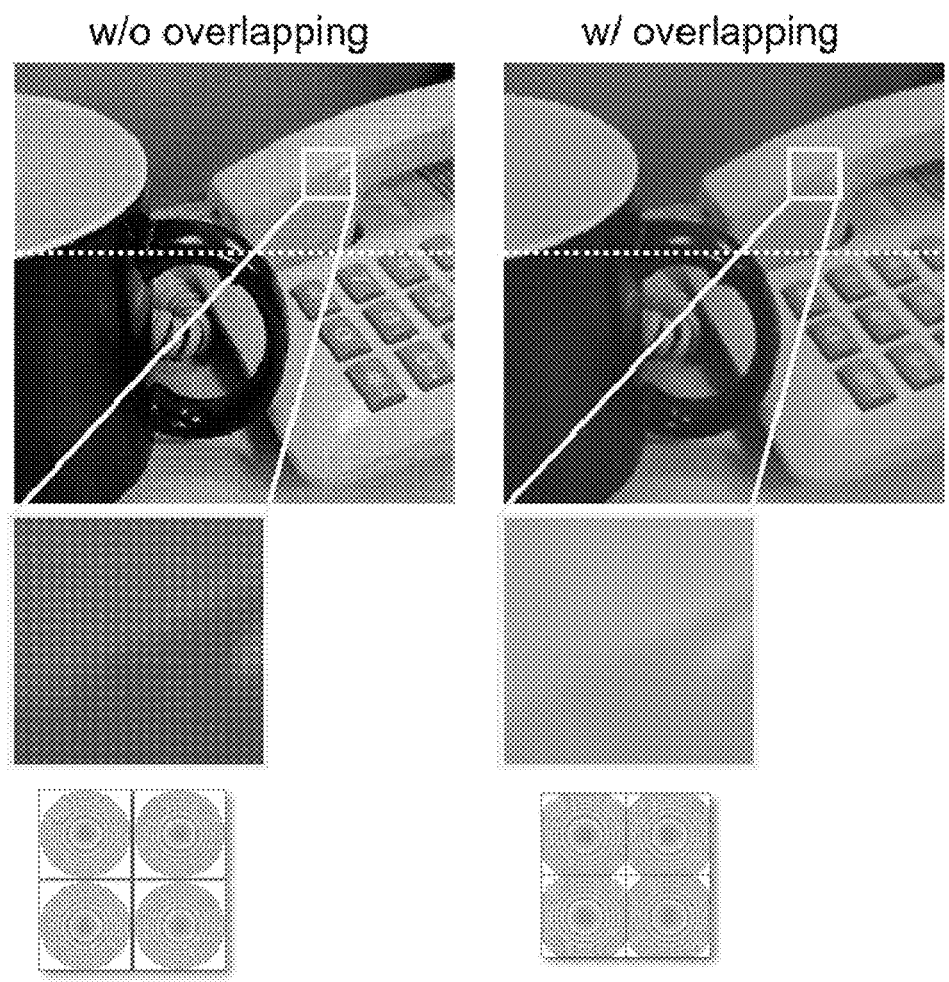
Figure 13D:
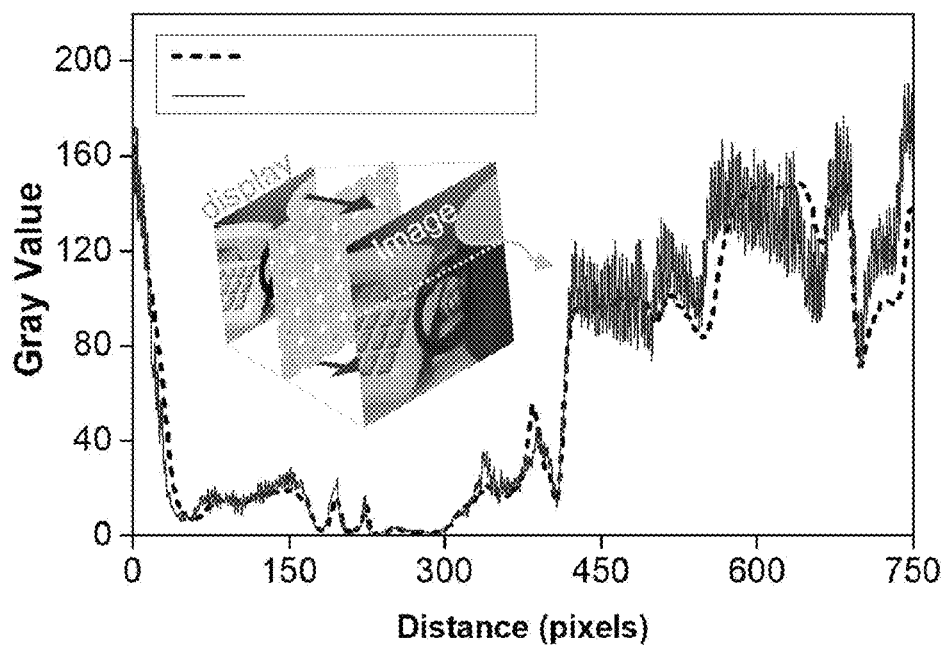

FIG. 13A shows the original image on the micro display (ground truth). FIG. 13B and FIG. 13C show the image after it passed through the overlapping metalens array and without overlapping metalens array, respectively. FIG. 13D is the gray level value calculated from the white dashed-line in FIG. 13B and FIG. 13C.

FIG. 13A shows the original image displayed on the micro display, FIG. 13B and FIG. 13C show the projected image through the metalens array without and with overlapping, respectively. It can be clearly seen that the pixelation is significantly eliminated. To quantitatively compare these two results, the gray level value from the white dashed-line in FIG. 13B and FIG. 13C are calculated in FIG. 13D. The result obviously evinces that the pixelation has effectively removed using the proposed overlapping metalens array as the main advantage of the overlapping metalens array.

Figures 14A, 14B, 14C:
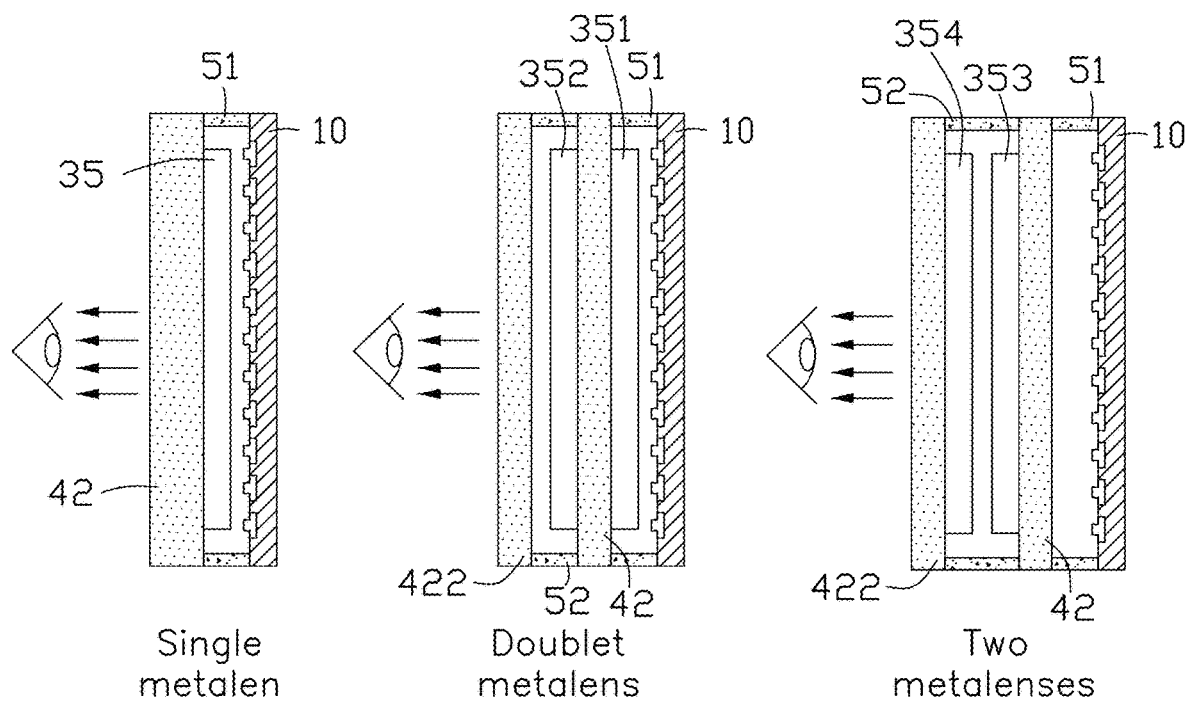
FIGS. 14A-14C illustrate three embodiments of different optical configurations of metalens array applied in metalens array of FIG. 3.

FIGS. 14A-14C illustrate three embodiments of different optical configurations of metalens array applied in metalens array 30 of FIG. 3. The micro display 10 can be with or without a polarizer depends on the type of metalens (isotropic or anisotropic) as disclosed in the description of the display device 90A or the display device 90B of FIG. 2A and FIG. 2B. FIG. 14A shows a device with only a single overlapping metalens array which can only address the chromatic aberration. The spacer 51, the overlapping metalens array 35 and the glass (sapphire) substrate 42 are arranged as the FIG. 14A shown. The overlapping metalens array 35 includes a plurality of nanostructures arranged on a surface of the substrate facing the micro display 10. To address the coma aberration, to either use a doublet metalens array or two individual metalens array. As shown in FIG. 14B, the overlapping metalens array 351 and 352 can be either a metalens array or a large single metalens. The order of the overlapping metalens array can be swapped as well. A spacer 52 and a transparent and flexible substrate 422 (like glass, sapphire, PMMA, etc.) are arranged in the positions shown in FIGS. 14B and 14C. The overlapping metalens array 351 and 352 are spaced apart between the micro display 10 and the flexible substrate 422, the plurality of nanostructures of the overlapping metalens array 351 and 352 are arranged on two opposite surfaces of the substrate and facing the micro display and the transparent flexible substrate, respectively. FIG. 14C shows two individual metalenses array facing each other. Either of metalens array 353 or metalens array 354 is the overlapping metalens array and the other one is a metalens array or a single metalens. The metalens arrays 353 and 354 have a glass (or sapphire, PMMA, etc.) substrate. The plurality of nanostructures of the metalens array 353 are facing the metalens array 354, the plurality of nanostructures of the metalens array 354 are facing the metalens array 353.

Figure 15A:
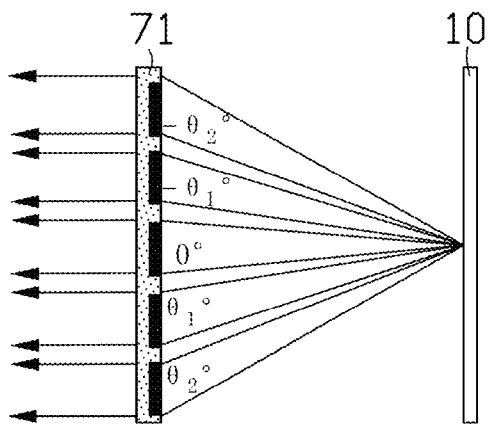
FIGS. 15A-15F illustrate some embodiments of metalens array with different collimating properties, different deflecting properties, and different converging properties.
Figure 15B:
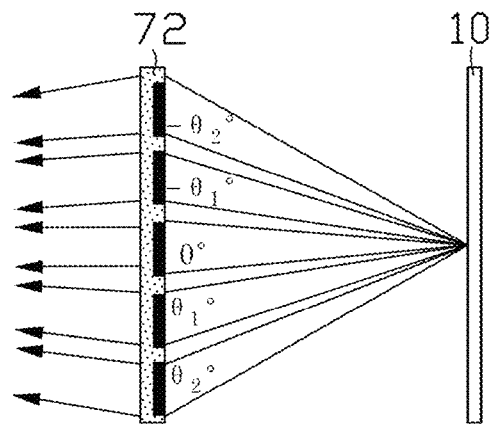
Figure 15C:
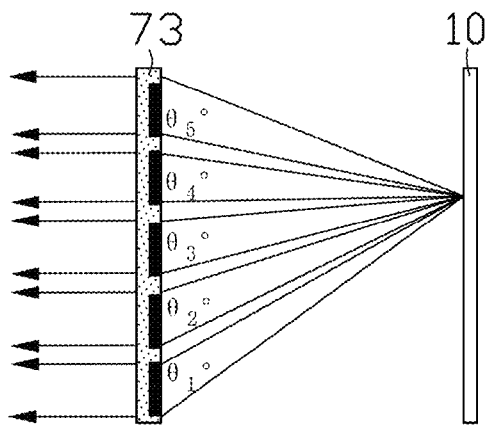
Figure 15D:
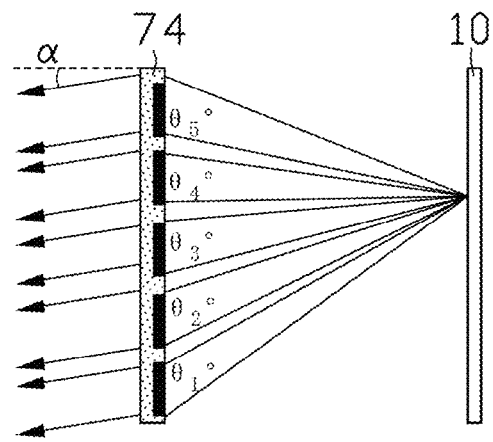
Figure 15E:
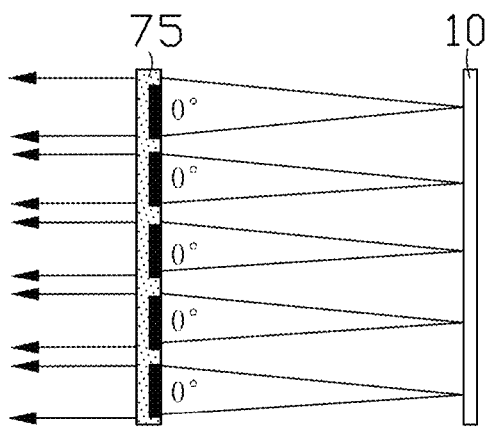
Figure 15F:
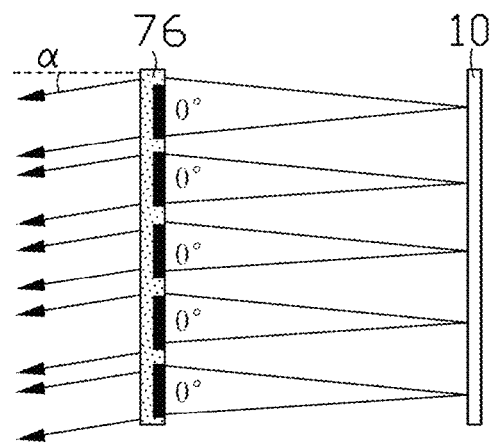

FIGS. 15A-15F illustrate some embodiments of metalens array with different collimating properties, different deflecting properties, and different converging properties. The plurality of the overlapping metalens arrays or metalens arrays. 71, 72, 73, 74, 75, and 76 can be either one presented in FIGS. 14A-14C. The micro display 10 with or without a polarizer depends on the type of metalens array (isotropic or anisotropic). FIG. 15A and FIG. 15E are on-axis design and the rest are off-axis scheme. The output light illuminated from the micro display 10 and passed through the metalens arrays 71-76 can be collimated, inclined, or converged. FIG. 15B is preferable when a large micro display and proportionally a large overlapping metalens array 72 is used, therefore, light beam needs to be focused on user's eyes otherwise some part of the displayed contents cannot be seen by the user. FIG. 15C, FIG. 15D, and FIG. 15F can be also utilized when the micro display 10 is vertically displaced to improve the visibility of the ambient light.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A metalens array comprising:
   an optical transparent substrate;
   a plurality of nanostructures arranged on the optical transparent substrate, the plurality of nanostructures arranged in a predetermined shape to define a plurality of metalenses, and the plurality of metalenses arranged in a partial overlapping configuration and arranged on the optical transparent substrate;
   two indium tin oxide (ITO) layers; and
   two alignment layers;
   wherein the optical transparent substrate are two optical transparent substrates, the plurality of nanostructures are covered by liquid crystal, the plurality of nanostructures and the liquid crystal are sandwiched between the two optical transparent substrates through the two alignment layers and the two ITO layers, the two ITO layers are configured to be applied with voltage.

2. The metalens array according to claim 1, wherein the plurality of nanostructures is formed in an isotropic, an anisotropic, or a combination of isotropic and anisotropic shapes.

3. The metalens array according to claim 1, wherein the metalens array further comprises a top electrode, the top electrode is patterned on one of the two ITO layers, the two ITO layers are configured to be applied with voltage.

4. The metalens array according to claim 1, wherein the plurality of nanostructures is a passive structure and changeable for an active and focus-adjustable metalens utilizing phase changing materials.

5. The metalens array according to claim 1, wherein every two adjacent metalenses of the plurality of metalenses are partially overlapped with an overlapping ratio under 50% to remove pixelation issues caused by the metalens array being used.

6. The metalens array according to claim 1, wherein every two adjacent metalenses of the plurality of metalenses are partially overlapped with an overlapping ratio under 30% to remove pixelation issues caused by the metalens array being used.

7. A display device comprising:
   a micro display configured to emit lights;
   at least one metalens array spaced apart from the micro display, the at least one metalens array configured to transmit the lights emitted by the micro display, the at least one metalens array comprising:
   an optical transparent substrate;
   a plurality of nanostructures arranged on the optical transparent substrate, the plurality of nanostructures arranged in a predetermined shape to define a plurality of metalenses, and the plurality of metalenses arranged in a partial overlapping configuration and arranged on the optical transparent substrate;
   two indium tin oxide (ITO) layers; and
   two alignment layers;
   wherein the optical transparent substrate are two optical transparent substrates, the plurality of nanostructures are covered by liquid crystal, the plurality of nanostructures and the liquid crystal are sandwiched between the two optical transparent substrates through the two alignment layers and the two ITO layers, the two ITO layers are configured to be applied with voltage.

8. The display device according to claim 7, wherein the plurality of nanostructures is arranged on a surface of the optical transparent substrate facing the micro display.

9. The display device according to claim 7, further comprising a transparent flexible substrate,
   wherein the at least one metalens array spaced apart between the micro display and the transparent flexible substrate, the plurality of nanostructures are arranged on two opposite surfaces of the optical transparent substrate and facing the micro display and the transparent flexible substrate, respectively.

10. The display device according to claim 7, further comprising a first metalens array and a second metalens array;
    wherein the first metalens array is spaced apart between the second metalens array and the micro display;
    in the first metalens array, the plurality of nanostructures arranged on a surface of the optical transparent substrate facing the second metalens array;
    in the second metalens array, the plurality of nanostructures arranged on a surface of the optical transparent substrate facing the first metalens array.

11. The display device according to claim 7, further comprising a polarizer, the polarizer spaced apart between the micro display and the at least one metalens array, the polarizer configured to polarize the lights emitted by the micro display to the at least one metalens array.

12. The display device according to claim 7, wherein the micro display and the at least one metalens array are arranged on-axis or off-axis, the at least one metalens array is configured to transmit the lights emitted by the micro display, rendering the lights transmitted through the at least one metalens array being collimated, inclined, or converged.

13. The display device according to claim 7, wherein the plurality of nanostructures is formed in an isotropic, an anisotropic, or a combination of isotropic and anisotropic shapes.

14. The display device according to claim 7, wherein every two adjacent metalenses of the plurality of metalenses are partially overlapped with an overlapping ratio under 50% to remove pixelation issues caused by the metalens array being used.

15. The display device according to claim 7, wherein every two adjacent metalenses of the plurality of metalenses are partially overlapped with an overlapping ratio under 30% to remove pixelation issues caused by the metalens array being used.

* * * * *